Patented Mar. 22, 1932

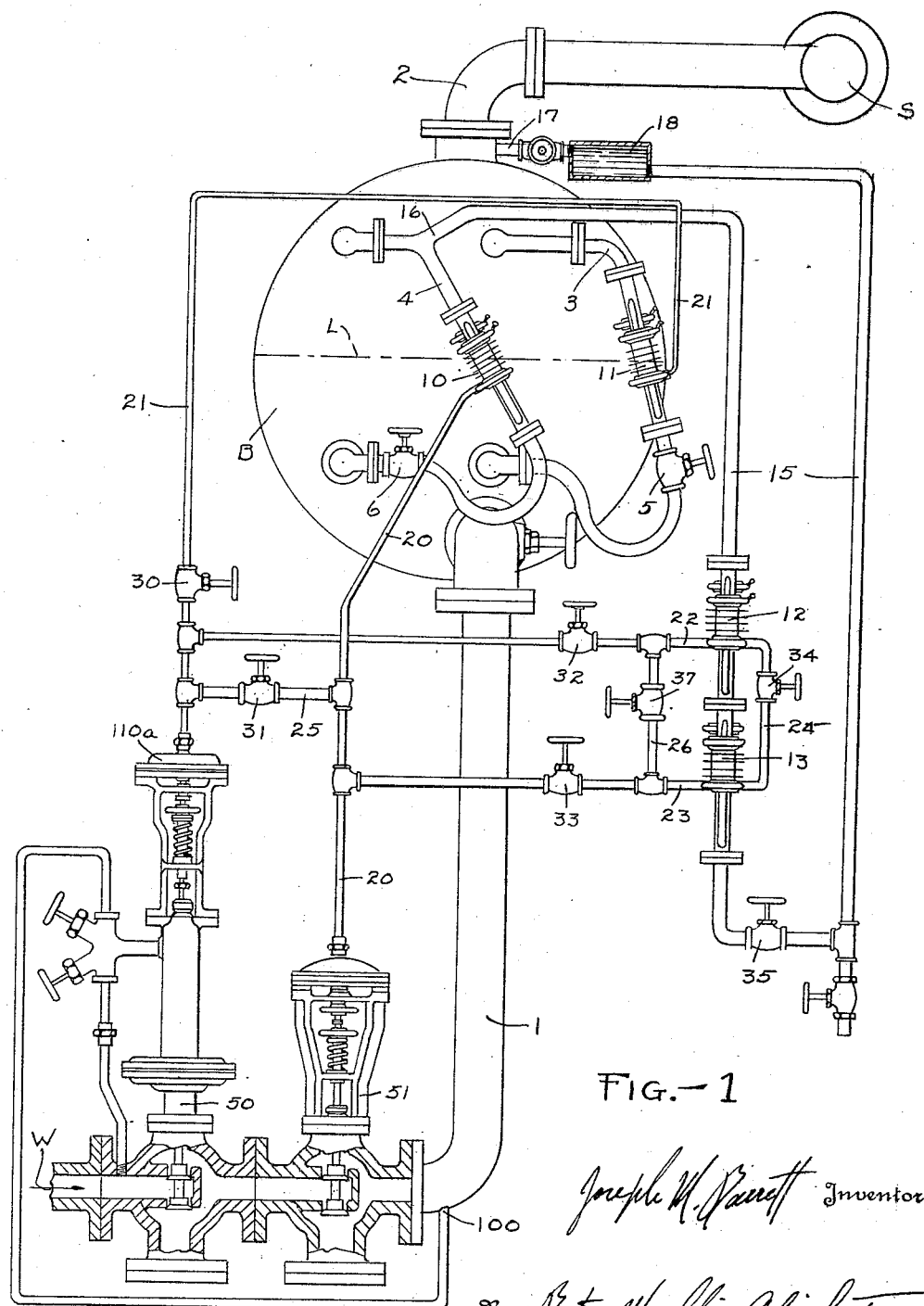
FIG.—1

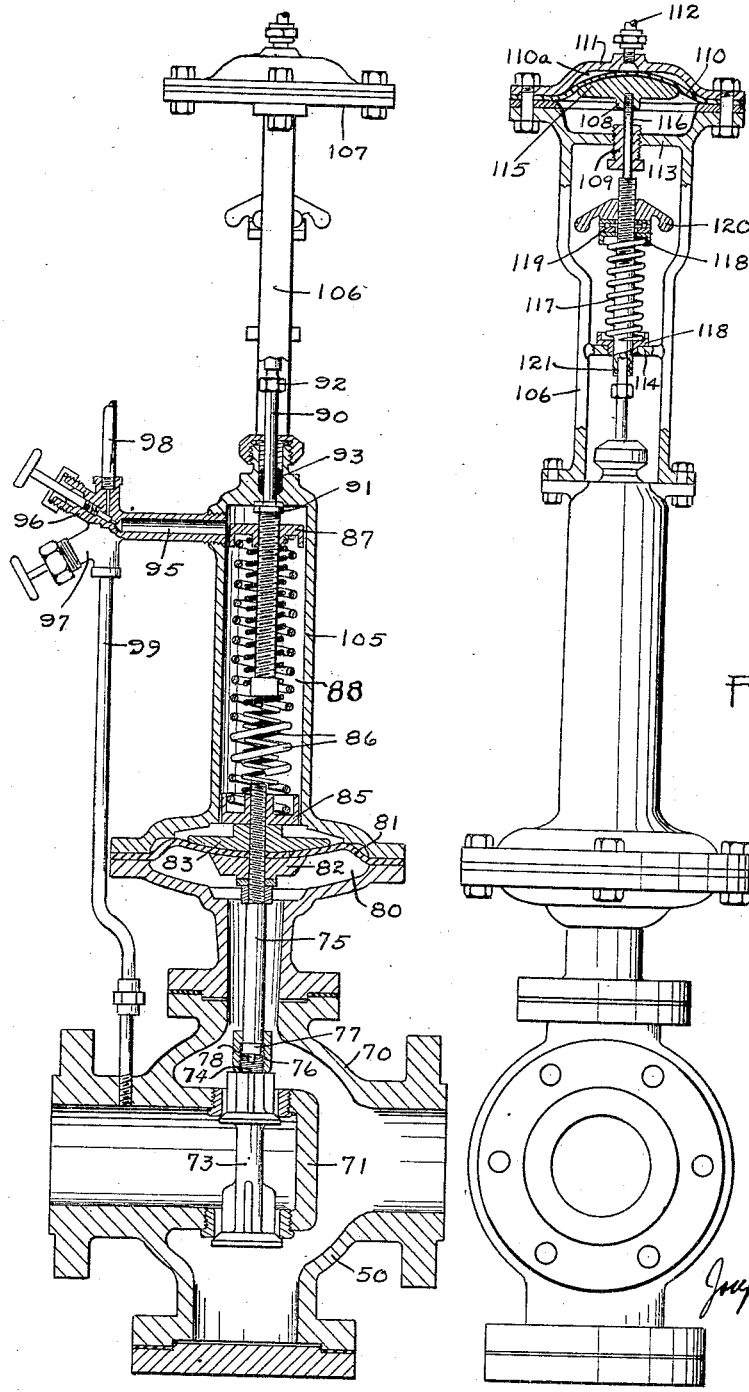

1,850,651

UNITED STATES PATENT OFFICE

JOSEPH M. BARRETT, OF FOSTORIA, OHIO, ASSIGNOR TO THE SWARTWOUT COMPANY, OF CLEVELAND, OHIO, A CORPORATION OF OHIO

METHOD AND APPARATUS FOR VARYING EXCESS FEED WATER PRESSURE

Application filed October 22, 1926. Serial No. 143,326.

This invention relates to regulating the flow of water to boilers and has for its primary object the correlation of the rate of flow of feed water to the need for feed water according to the condition of boiler operation.

In my copending application Serial No. 27,735, I have disclosed a system with certain refinements for controlling the flow of feed water to a boiler wherein the pressure drop through the feed water valve is maintained substantially constant, within the limits of the apparatus, so that the flow through the feed water valve will be proportional to the opening of the valve. In this system the opening of the feed water valve is varied with relation to the change in water level in the boiler drum. In my copending application, Serial No. 27,736 filed May 4th, 1925, I have disclosed a system wherein the pressure drop through the feed water valve is maintained substantially constant and in this system, the opening of the valve is varied both with regard to change in water level in the boiler drum and with regard to the load or the rate or flow of steam from the boiler.

Having observed both of the above mentioned systems in operation, I have found that very substantial increases in efficiency have resulted from their use. My present invention is concerned with still further improvement and takes into account certain factors with which I have been unable to cope in the former systems. As I have pointed out before in my prior application the problem of regulating the flow of feed water becomes more and more acute as exceedingly high boiler pressures are used, particularly since the pressure and velocity of feed water are very great. The very high pressure boilers have approached more and more the characteristics of flash boilers and I find that in regulating the flow of feed water that one must not only take into account the instantaneous apparent demand for feed water, but must anticipate the demand and prepare to meet it before it actually appears to exist. I have found moreover, that a perfectly constant drop has been almost impossible to obtain due to the displacement of the operating members. I find that the constant drop is not ideal but I do find and disclose herewith a method and apparatus not for maintaining a constant drop through the feed water valve, but for controlling a variable drop.

It is therefore among the objects of my invention to control the variation in pressure drop at the feed water valve to provide for the many different circumstances and demands which are placed or are about to be placed upon any given boiler. Thus, in one instance I find that a boiler carrying a "base load" wherein the boiler rating does not vary greatly or rapidly that most satisfactory results may be obtained by increasing the pressure drop to the regulating valve in approximately the same proportion with the opening of the regulating valve itself. As disclosed in my prior application, the regulating valve is opened in about direct proportion with the fall in water level from a given point. According to my invention presently to be described, I am enabled to increase the pressure drop at the regulating valve in about the same proportion, so that when the regulating valve is 30% opened, the pressure drop therethrough may be 30 pounds and when the regulating valve is 60% open the pressure drop therethrough may be stepped up to 50 or 60 pounds. By such a system, the water level can be maintained within very narrow limits which in turn leads to a better heat balance and to higher boiler efficiency. I do not care to be limited to specific arrangements for it can be seen that different variations in pressure drop at the feed water regulating valve will be separately advantageous only when correlated to the particular circumstances under which a given boiler may be operated.

I make provision therefore in my system to change the variation in pressure drop either step by step with the increase in opening of the regulator valve or in instances which I am about to describe I vary the pressure drop at the regulating valve in proportion with or in accordance to the variation in load on the boiler. I find for instance that a boiler which is subjected to substantial changes in rating during the course of its operation, is apt to have its water level varying between wide limits with resulting loss in efficiency. Even where an approximately constant pressure drop through the regulating valve is maintained and where the opening of the feed water valve is varied not only by water level, but also in accordance with the load on the boiler, a circumstance may arise where the feed water valve is wide open but still the flow of feed water is not enough to "catch" the drop in water level before it has substantially changed. According to my invention I provide one remedy for this situation by increasing the difference in pressure around the feed water valve immediately as the load starts to increase either before or with the opening of the regulating valve. In this manner if there be a sudden demand, the difference in pressure around the regulating valve may be doubled before the regulating valve itself changes its opening. In other instances I may merely want to anticipate the fall of water level in the boiler so I use separate means responsive to different changes in water level, one governing the opening of the regulating valve and the other varying the pressure drop through the valve. But, as will appear from the following detailed description of my apparatus, my basic object is to control the pressure drop through the regulating valve either by increase or decrease or by set change between predetermined limits or by combination of these variations which I deem most appropriate to compensate for the duty or requirements placed upon any given boiler.

In the drawings Fig. 1 is a layout of the apparatus comprising the general plan of my invention: Figs. 2 and 3 disclose the structure of the variable differential valve.

In Fig. 1, I designate at W the header leading from the feed water pump wherein the fed water is maintained at a pressure substantially higher than boiler pressure. 1 show the feed water line 1 leading to the boiler drum B wherein the water level is normally maintained along the line L. The steam line 2 leads from the boiler to the main steam header S. At 3 and 4 I show conduits leading into the boiler drum at points above and below the normal water level thereof. Associated with the conduit 4 and intersecting the plane of the normal water level I show pressure generator means 10 which may be similar to that described in detail in my U. S. Patent No. 1,650,108, and connected by the conduit 20 to the valve 51 according to the practice disclosed in the patent to Copley No. 1,193,125 issued August 1, 1916. Associated with the conduit 3, I show similar pressure generator means 11 and the conduit 21 leading therefrom. For the purpose of illustration I show the generator 11 mounted at a slightly higher elevation with regard to the water level L than the generator 10, and disposed at an angle slightly nearer the vertical. The use of the generator 11 may be alternative and I do not care to be limited to its specific inclusion in my invention. At 15 I show a monometer loop or U-tube which is adapted to contain both water and steam and which is connected to the boiler system at 16 into the conduit 4 and at 17 into the nozzle of the boiler. I have more fully described the advantages of such a loop and the operation of the apparatus associated therewith in my copending application, Serial No. 27,736. A Pitot tube or other suitable means can be employed wherein the height of the water column in the high pressure leg of the loop will be lessened as the load on the boiler increases so that steam may come into contact with the generator associated with it. At 18 I show a reservoir as described in my copending application. On the high pressure leg of the loop, I show pressure generator means 12 and 13 which may be similar to the pressure generator 10 described above. From the generator 12 I show the conduit 22 leading therefrom and from the generator 13, the conduit 23. The correlation and function of the several generators and pressure conduits with regard to regulations of flow of feed water will be presently pointed out. I do not however, care to be limited specifically to pressure generators as disclosed, but I do wish to show that suitable thermal or pressure responsive elements with suitable connecting means when arranged according to my invention will perform the functions and achieve the desired results.

In the feed water line I show the diaphragm actuated feed water regualting valve 51 mentioned above. Immediately adjacent the valve 51 and positioned in the line between the valve 51 and the pump or the feed water header, I show the valve 50 which is more adequately shown in Fig. 2. The valve 50 may comprise the body portion 70 adapted to carry valve seats 71 which may be engaged by the valve members 73. Valve rod 75 engages the valve member 73 by means of the member 76 and the threaded portion 74 along with the flanged head 77 and the tongue and groove arrangement 78 as shown. The rod 75 passes freely through the throat of the body 70. Ready communication is provided between the valve chamber and the diaphragm chamber 80. In the diaphragm chamber 80 I show the diaphragm 81 engaged by clamping members 82 and 83 which are adjustably positioned and carried by the valve rod 75. The valve rod 75 also engages the cup-shaped spring retaining member 85 which is adapted to carry one or more springs 86. The valve rod 75 terminates a short distance above the member 85. Engaging the upper ends of the springs 86, I show the cup-shaped member 87 movable vertically in suitable guides and in threaded engagement with the rod 90 which extends into the spring chamber. The rod 90 is provided with a shoulder 91 which limits its upward movement and is provided with a hexagonal shoulder forming the nut 92 by means of which the position of the member 87 may be varied and the compression upon the spring 86 may be adjusted. Suitable packing means are shown at 93. Communicating with the spring chamber 88, I show the T connection 95 with the auxiliary valves 96 and 97 and the conduits 98 and 99 leading therefrom. The conduit 99 is shown comunicating with the body 70 of the valve on the side of the direction of inflow. Referring back to Fig. 1, the conduit 98 is shown as being tapped into the line 1 at a point near the valve 51 but between the valve 51 and the boiler at the point 100. The cooperative relation between that portion of the valve 50 just described and the valve 51 is shown in my copending application, Serial No. 27,735 mentioned above wherein when the auxiliary valve 97 is closed and the auxiliary valve 96 is opened, a constant pressure drop is obtained through the valve 51, which drop is determined by the compression of the spring members 86 and may be adjusted by means similar to the nut 92 and the rod 90.

As pointed out in the foregoing, I have found that a constant drop through the valve 51 is not ideal, but I do find that if the drop through the valve 51 is controlled in accordance with the requirements placed upon the boiler that superior regulation and a higher boiler efficiency can be had. Thus referring back to Fig. 2, I show the means for controlling the pressure drop through the valve 51. The spring chamber may be embodied in a casing 105, and on this casing may be suitably mounted a frame 106 which is shown extending upwardly with the rod 90. The top of the frame 106 may carry an annular flange 107 on which may be mounted a diaphragm 110 enclosed in a diaphragm casing 111 forming the chamber 110a. Leading from the chamber above the diaphragm 110 I show the conduit connection 112. Spaced across the frame member 106 I show the transverse frame members 113 and 114. Resiliently urged into contact with the lower surface of the diaphragm 110 I show the mushroom-shaped member 115 carried by the rod 116 which is adjustably engaged therewith. In threaded engagement with the cross member 113, I show the adjustable travel limit member 109, freely encompassing the rod 116. The member 109 is adapted to contact with the lug 108 on the mushroom 115 so that the downward movement of the diaphragm 110 and the rod 116 may be limited to any given amount. Aligned with the rod 116 is a spring 117 carried by cup-shaped retaining members 118 and engaged between the transverse frame member 114 and the nut 120. The nut as shown is in threaded engagement with the rod 116 and having anti-friction bearings at 119 adjacent one of the spring retaining members 118. The lowermost end of the rod 116 may provide a cup-shaped portion 121 comprising a female member into which the upper end of the rod 90 extends. The male and female connection between the rod 116 and the rod 90 provides that the rods be freely movable relative to each other except when the head of the rod 90 contacts with the bottom of the member 121. From the structure described it will be seen that the character of the response of the valve 50 may be changed in several ways:

First, the primary excess pressure exerted by the spring member 86 may be set through the nut 92. Second, the spacing between the rod 116 and the rod 90 may be varied through the positioning of the rod 116 with relation to the mushroom shaped-member 115. Thirdly, the compression of the spring 117 by means of the nut 120 may be varied to hold the rod 116 in its uppermost position until the pressure on the diaphragm 110 exceeds the pressure on the spring 117; and fourthly, the movement of the diaphragm may be limited by the member 109.

Referring back to Fig. 1, it will be seen that in the conduits 3, 4 and 15, I provide valves 5, 6 and 35 respectively by means of which I am able to fix water legs in each of the conduits so that if it be so desired the pressure generator associated with each of the conduits may be rendered inoperative. From the conduit 20 I show the conduit 25 leading through the valve 31 through part of the conduit 21 to the diaphragm chamber 110a above the diaphragm 110 of the valve 50. The conduit 21 leads from the generator 11 through the valve 30 so that by means of the valve 30 and 31, I may selectively utilize the pressures generated in the generators 10 or 11 to actuate the diaphragm 110. On the U-tube 15 I show the generators connected together by the conduit 24 having the valve 34 therein. By means of the valve 34 I may use the generators 12 and 13 independently or collectively as I choose. The pressure conduit 22 leads through the valve 32 into the diaphragm chamber 110a. The pressure conduit 23 leads to the conduit 20 through the valve 33 whence it communicates with diaphragm chamber of the feed water regulating valve 51. Between the conduits 22 and 23 I show the by-pass conduit 26 with the valve 37.

In operation, any one of several connections may be used wherein a regulation suitable to the requirements of a specific boiler may be obtained. Thus the most simple arrangement and connection may be affected for what I am pleased to term a "base load" condition by closing the valves 30, 5, 32, 33 and 35 so that the pressure generator 10 alone functions. The valve 31 is open so that the pressure from the generator 10 is transmitted both to the diaphragm of the feed water regulating valve 51 and to the diaphragm 110 of the valve 50. Under such circumstances when the water level in the boiler falls, pressure is created in the generator 10, the valve 51 is open, and the pressure drop at the valve 51 is increased by reason of the pressure in the chamber 110a. The increase in pressure drop may be simultaneous with the opening of the valve 51 and the character or the rate of increase in pressure drop will depend upon the adjustment made by means of the nut 120 and the spring 117 (see Fig. 3) of the valve 50. The increase in pressure drop or the variation in the differential drop may therefore be simultaneous and in direct proportion with the opening of the valve 51 or may be maintained constant up to a certain point and then increased or if the spring 117 is greatly compressed, the differential pressure may not be affected at all.

Now if it be desired to change the character of the regulation to meet other boiler requirements, one may close the valve 31 and open the valves 30 and 5. With this connection I operate the feed water regulating valve 51 solely in response to the pressure generated in the generator 10. I use the generator 11 for exerting a pressure on the diaphragm 110 to control the pressure drop at the valve 51. In the drawings I have shown the generator 11 as being disposed nearer the vertical and slightly above the generator 10 in such a position that the excess pressure in chamber 110a would be increased a substantial amount when the valve 51 was slightly open, and then as the water level continues to lower, if it did, the increase in excess pressure would be more gradual than the rate of opening of the valve 51. As mentioned above the position of the generator 11 in the drawings is merely an illustration of one of several positions any one of which might better serve the purpose for a given condition. The use of the separate generator 11 facilitates the non-coincident change in excess pressure with regard to the opening of the valve 51 in response to a change in water level.

As mentioned above my invention is adapted to control the change in excess pressure or difference in pressure around the valve 51 in response to various loads on the boiler with or without regard to change in water level thereof. To accomplish this result according to the diagram of Fig. 1, I close the valves 5 and 30, thereby removing from service the generator 11. The valves 31, 32, 33 and 34 and 35 may be open, whereby the same pressure is exerted upon the diaphragm 110 as is exerted upon the actuating diaphragm of the valve 51. This pressure is the result of compound effect of the generators 10, 12 and 13. As far as the action of the valve 51 is concerned, the operation is disclosed in my co-pending application, Serial No. 27,736, wherein the opening of the valve 51 is affected both by the lowering of the water level in the boiler and by the rate of flow of steam from the boiler. It will be seen therefore that the tendency to increase the pressure drop through the valve 51 will be coincident with and proportional to the tendency to open the valve 51, due regard being had to the tension on the spring 117 and the spring 86. If it be desired to actuate the valve 51 in response to a change in water level and a change in load but to actuate or to change the excess pressure only in response to the load, valves 34 and 31 may be closed, the valves 37 and 30 being closed, so that the pressure on the diaphragm 110 is effected by the generator 12 alone. If it be desired to vary the opening of the valve 51, solely in response to change in water level, while the excess pressure is controlled solely in response to the load, the valve 33 may then be closed and then either or both the valves 37 or 34 may be opened or not as is desired so that the valve 51 responds to change in water level alone in response to the pressure in the generator 10 and the excess pressure is varied only in response to the load on the boiler through the medium of the manometer loop 15 and the generator 12 or 12 and 13 together. With the auxiliary valves positioned as just described, the valves 5 and 30 can then be opened and the excess pressure may also be made to respond to the change in water level according to the position of the generator 11 as well as the change in load which effects the operation of the generator 12 or the generators 12 and 13.

In the following claims I may from time to time use the expression "thermal conditions in the boiler" with the intention of referring broadly to one or more of several boiler conditions which I choose to include within this term. For example, boiler pressure is obviously a thermal condition, since of course, the steam pressure varies with the heat content, both in the water and steam. I regard boiler load as a thermal condition inasmuch as the rate of input of heat to the liquid is a necessary incident to the maintenance of output of boiler load. Insofar as the boiler feed is controlled by water level, a decrease in water level is an incident to an increase in load and ipso facto a thermal condition when viewed from this aspect.

It appears from the foregoing that other arrangements might produce beneficial results in any given installation. However, I do not care to be limited to any specific arrangement, but I do wish to show the adaptability and feasibility of using the principles of my invention to meet the requirements for boiler operation under varying circumstances and conditions. I do not wish to be limited to the use of pressure generators and diaphragm valves exclusively for various means could be substituted for these specific elements, and, if arranged and connected within the teaching of my invention, similar results and benefits could be obtained. The primary objects remaining the same, to wit; to vary the pressure drop through the feed water valve in accordance with or in anticipation of the immediate need for feed water in the boiler according to service required of the boiler.

I claim:

1. A feed water pipe, a valve in said pipe, means for increasing the opening of said valve and means for simultaneously increasing the pressure drop through said valve.

2. In a boiler feed water system, a feed water pipe, a valve in said pipe, means for maintaining an excess of feed water pressure on one side of said valve with reference to the pressure on the other side of said valve and means for varying the excess pressure dependent upon thermal conditions of the boiler.

3. In a boiler feed water system, a feed water pipe, a valve in said pipe, means for varying the opening of said valve dependant upon thermal conditions in the boiler, means for controlling the fluid pressure drop through said valve, and means for varying said fluid pressure drop dependant upon the thermal condition of the boiler.

4. In a boiler feed water system, a feed water pipe, a valve in said pipe, means for varying the position of said valve dependant upon the elevation of water level in the boiler, means for controlling the fluid pressure drop through said valve, and means for varying said fluid pressure drop dependant upon the thermal conditions in the boiler.

5. In a boiler feed water system, a feed water pipe, a valve in said pipe, means for varying the position of said valve depending upon the load on the boiler and means for varying the pressure drop through said valve, depending upon thermal conditions of the boiler.

6. In a boiler feed water system, a feed water pipe, a valve in said pipe, means for varying the position of said valve depending upon the elevation of water level in said boiler, means for varying the position of said valve depending upon the load on said boiler and means for varying the pressure drop through said valve dependant upon thermal conditions of the boiler.

7. In a boiler feed water system, a feed water pipe, a valve in said pipe, means for varying the opening of said valve, depending upon the elevation of water level in said boiler, and means for varying the pressure drop through said valve dependant upon the elevation of water level in the boiler.

8. A device according to claim 7 wherein the pressure drop through the said valve is increased in response to a decrease in water level in the boiler.

9. A device according to claim 7 wherein the pressure drop through the valve is varied coincident with the change of the opening in said valve.

10. In a boiler feed water system, a feed water pipe, a valve in said pipe, means for varying the opening of said valve depending upon the elevation of water level in the boiler and means for controlling the pressure drop through said valve depending upon the load on the boiler.

11. In a boiler feed water system, a feed water pipe, a valve in said pipe, means for varying the opening in said valve dependant upon the water level in said boiler and means for controlling the fluid pressure drop through said valve depending upon the water level in the boiler and the load on the boiler.

12. In a boiler feed water system, a feed water regulating valve for controlling the flow of water to the boiler, means for varying the opening of said valve depending upon the load on the boiler and means for varying the fluid pressure drop through said valve depending upon the change in water level in the boiler.

13. In a boiler feed water system, a feed water valve, means for varying the opening in said valve dependant upon the load on the boiler, and means for varying the fluid pressure drop through said valve, depending upon the load upon the boiler.

14. A device according to claim 10 wherein the fluid pressure drop across the valve is increased when the load on the boiler increases and during which time the valve opening increases to meet the added demand for feed water due to the increased load.

15. In a boiler feed water system, a feed water regulating valve, means for varying the opening of said valve depending upon the load on the boiler, and means for varying the fluid pressure drop through said valve depending upon the load on the boiler and the water level in the boiler.

16. In a boiler feed water system, a feed water valve, means for varying the opening of said valve depending upon the load on the boiler and water level in the boiler and means for varying the fluid pressure drop through said valve depending upon the elevation of the water level in the boiler.

17. In a boiler feed water system, a feed water valve, means for varying the opening of said valve depending upon the load on the boiler and the water level in the boiler, and means for varying the fluid pressure drop through said valve depending upon the load on the boiler.

18. In a boiler feed water system, a feed water valve, means for varying the opening of said valve depending upon the load on the boiler and the elevation of water level in the boiler, and means for varying the fluid pressure drop through said valve depending upon the load on the boiler and the change in water level in the boiler.

19. A device according to claim 15 wherein the variation in fluid pressure drop through the valve is coincident with the variation in the opening of the valve.

20. A device according to claim 15 wherein the fluid pressure drop through the valve is increased when the opening of the valve is increased.

21. In a boiler feed water system the combination of a boiler, a feed water valve therefor, means for controlling the fluid pressure drop through said valve, a conduit connected to the boiler drum and adapted to span the normal water level thereof, pressure generator means associated with said conduit and responsive to changes in water level in the boiler and means connecting said pressure generator means to said first named means whereby the fluid pressure drop through said valve is varied in response to the pressure exerted by the generator means.

22. In a boiler feed water system, the combination of a boiler, a conduit connected to said boiler and adapted to span the normal water level thereof, pressure generator means associated with said conduit, a pressure responsive feed water regulator valve, pressure responsive means adapted to vary the fluid pressure drop through said valve, and means whereby said last named means and said valve are actuated by said pressure generator means.

23. The method of controlling flow of feed water to a boiler which consists in varying the opening of the feed water valve and varying the differential in pressure at said valve in response to the thermal conditions of the boiler.

24. The method of regulating the flow of feed water to a boiler which consists in varying the opening of the feed water valve in response to changes in the thermal condition of the boiler and varying the differential in pressure at said valve in response to changes in the thermal condition of the boiler.

25. In a boiler feed water system, a feed water pipe, a valve in said pipe, means for maintaining an excess of feed water pressure on one side of said valve with reference to the pressure on the other side of said valve, means for varying the excess pressure dependant upon thermal conditions of the boiler and means for limiting the variation of the said excess pressure.

26. In a boiler feed water system, a feed water pipe, a valve in said pipe, means for maintaining an excess of feed water pressure on one side of said valve with reference to the pressure on the other side of said valve, means for varying the excess pressure dependant upon thermal conditions of the boiler and means for controlling the characteristic of the variation of the said excess pressure.

27. The combination of a boiler a feed water pipe, an orifice in said pipe, and means responsive to boiler conditions for regulating the flow of feed water by varying the fluid pressure drop across said orifice.

28. A boiler, a feed water pipe, an orifice in said pipe, and means responsive to change in boiler load for regulating the flow of feed water by varying the fluid pressure drop across said orifice.

29. A boiler, a feed water pipe, an orifice in said pipe, and means responsive to change in boiler water level for regulating the flow of feed water through said pipe by varying the fluid pressure drop across said orifice.

30. A boiler, a feed water pipe, an orifice in said pipe, and means responsive to change in boiler water level and boiler load for regulating the flow of feed water by varying the fluid pressure drop across said orifice.

31. The method of feeding boilers which consists in controlling the fluid pressure drop across a given orifice in the feed water pipe by the thermal condition in the boiler.

32. In a boiler feed water system, feed water valve means, means for controlling said valve means depending upon the elevation of water level in the boiler, means for controlling said valve means depending upon the load in the boiler, and means for varying the pressure drop through said valve means dependant upon boiler conditions.

33. In a boiler feed water system, feed water valve means, means for positioning said valve means depending upon the load on the boiler and water level in the boiler, and means for varying the fluid pressure drop through said valve means depending upon the elevation of water level in the boiler.

34. In a boiler feed water system, feed water valve means, means for positioning said valve means depending upon the load on the boiler and the water level in the boiler and means for varying the fluid pressure drop through said valve means depending upon the load on the boiler.

35. In a boiler feed water system, feed water valve means, means for positioning said valve means depending upon the load on the boiler and the elevation of water level in the boiler and means for varying the fluid pressure drop through said valve depending upon the load on the boiler and the water level in the boiler.

36. The combination of a boiler, a feed water pipe, an orifice in said pipe and means for regulating the flow of feed water by varying the fluid pressure drop across said orifice comprising a fluid pressure actuated valve having a resultant fluid actuating pressure substantially equal to the difference between pressures on opposite sides of said orifice, pressure means opposing the resultant fluid actuating pressure whereby pressure is effected to control the movement of said valve, and means responsive to varying boiler conditions for varying said pressure.

In testimony whereof, I hereunto affix my signature.

JOSEPH M. BARRETT.